Figure 1:
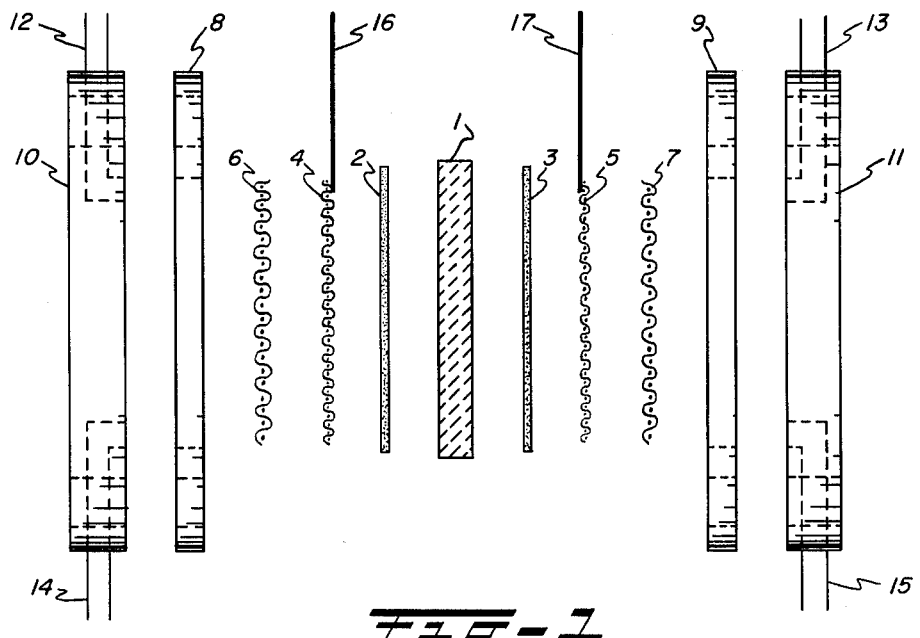

INVENTORS.
Stanley H. Langer
Henry P. Landi

ATTORNEY 3,248,267
CATALYTIC ELECTRODE AND FUEL CELL
CONTAINING THE SAME
Stanley H. Langer, Stamford, Conn., and Henry P. Landi, Yorktown Heights, N.Y., assignors to American Cyanamid Company, Stamford, Conn., a corporation of Maine
Filed Dec. 10, 1962, Ser. No. 243,421
24 Claims. (Cl. 136—86)

This invention relates to catalytic electrodes of the type suitable for use in fuel cells. More particularly, this invention relates to catalytic electrodes employing various metals such as platinum metals as the catalytic agent.

Formed electrodes of the type suitable for use in fuel cells and containing platinum metals are known. Such electrodes typically contain relatively large amounts of platinum metal, often as much 90% or more by weight thereof. In preparing such electrodes, a catalytic metal such as platinum black is optionally mixed with a support material such as carbon black, and a binder, which frequently is also a waterproofing agent or an agent which prevents flooding of the electrode in use, as in a hydrogen-oxygen fuel cell. Such compositions may then be formed as by being molded, and employed in a fuel cell.

While platinum metals are possibly best known for use as the catalytic metal in fuel cell electrodes, other catalytic metals, such as are discussed more fully hereinafter, are known to demonstrate catalytic activity in such devices.

In addition to platinum metal-carbon electrodes of the type described above, electrodes formed of platinum black and binder-waterproofing agents are also employed as electrodes in fuel cells.

Platinum metals are for the most part very expensive. This is particularly true of platinum itself and to a lesser degree to palladium and other members of the series. Accordingly, any known method of decreasing the amount of such metals required for use in electrodes without reducing the efficiency of the electrode or while improving such efficiency would be an important advance. Further, of course, any method of employing conventional amounts of such metal in a manner that produces a superior and even more efficient electrode than those previously known also constitutes an important advance.

In addition to the above-mentioned considerations regarding catalytic metal containing electrodes, and in particular platinum metal containing electrodes, procedures which render it easier to form or shape such electrodes and strengthen the same without reducing their efficiency or while improving such efficiency would also be a highly significant advance in the manufacture of electrodes for use in fuel cells.

Accordingly it is an object of this invention to provide an electrode of the type suitable for use in fuel cells which is of superior efficiency for a given amount of catalytic metal.

It is a further object of this invention to provide an electrode of the type suitable for use in fuel cells which is characterized by ease in preparation and improved mechanical strength when compared with the strength of similar catalyst structures.

Another object is to provide a simple and straightforward procedure for preparing such electrodes.

A still further object of this invention is to provide improved fuel cells employing such catalytic electrodes.

These and other objects and advantages of the present invention will become more apparent from the detailed description set forth hereinafter.

In general, all fuel cells contain what hereinafter will be referred to as "a catalyst system." By the use of this term "a catalyst system" and "catalyst system" it is meant the following three elements: an electrolyte, electrodes or electrocatalysts, and current collectors. Suitable collectors may be screens or perforated or corrugated plates and their equivalents.

In a typical fuel cell of the type generally contemplated in the following description, the electrolyte is constituted by a base or acid-containing film or member such as paper or a suitable ion exchange membrane. It may also be in the form of free electrolyte. Normally, an electrode is positioned on either side of the electrolyte and the current collectors are positioned on top or at the outside of the electrode of the electrocatalyst. As is well known, these collectors normally facilitate removal of electrons from the anode electrode layer and introduction to the cathode electrode layer. An electrode layer and current collector may be considered together as a catalytic electrode assembly.

In a typical hydrogen-oxygen fuel cell or hydrogen-air fuel cell, the sites at which the electrochemical reactions occur, i.e., $H_2 \rightarrow 2H^+ + 2e$ at the anode, and $$\tfrac{1}{2}O_2 + H_2O + 2e \rightarrow OH^-$$

at the cathode are commonly thought to be positions in the electrodes involving the three phase contact of reactant gas, catalyst and electrolyte. The cathode reaction may be the same for fuel cells utilizing other fuels, illustratively ammonia and propylene. The electrolyte is though to penetrate the electrode layer to various degrees depending on its structure and extent of waterproofing.

When, for example, platinum, such as platinum black or large concentrations of supported chemically reduced platinum, is used as the electrode, a large number of active sites are available for the electrochemical process so that performance is excellent and extremely stable over a wide range of conditions such as electrolyte concentration, degree of water penetration into the electrode layer, and the like.

It is the electrode that the present invention is directed primarily to and to improved fuel cells containing such electrodes.

In accordance with the present invention, an improved formed porous electrode is provided by uniformly mixing a finely divided oxide of the metals of Groups III, IV and V of the Periodic Table, a binding agent, and a catalytic material, by which term [material(s)] it is meant catalytic metal per se, or supported catalytic metals, including such metals supported on carbon. The mixture is then formed. Frequently, after forming, the leaching of a substantial amount but not all of the metal oxide from the formed electrode is eeffected. As will be discussed more fully hereinafter, leaching results in improved porosity, which may be beneficial.

By the term "porous," as that term is employed herein in reference to the electrodes, it is meant that there is a large surface area contact between gas, solid and liquid phases in the electrode, and gas diffusing into the electrode has ready access to the liquid phase. As will be evident from the description hereinafter, the leached electrodes of this invention are characterized by a higher degree of porosity than the formed electrodes prior to leaching.

By the term "formed electrode," as that term is employed herein, it is meant a molded, rolled or otherwise shaped uniformly blended electrode composition.

The finely divided oxides of metals of Groups III, IV and V of the Periodic Table are employed in amounts up to about 75% by weight of the total weight of a formed electrode. It will be appreciated that the term "finely divided" is a relative one and as employed in this invention it contemplates materials having colloidal particle size as well as oxides having particle sizes substantially larger than colloidal particle, as for example up to 200 mesh and even larger. A wide range of particle sizes may be employed and it will be appreciated from the subsequent discussion that the amounts of materials employed and their state of fine division may be varied over a relatively wide range and still impart some beneficial effects to electrodes in accordance with this invention.

The finely divided metal oxides may be hydrated or non-hydrated and are water insoluble but capable of being removed to a substantial degree from the formed electrode by strong base or acid, in which they are soluble, or by various water soluble complexing agents. Illustratively, such oxides are the oxides of amphoteric elements such as silica, alumina, titania, zirconia and the like. These and other oxides may be employed singly or in combination with one another. A particularly preferred species of metal oxide are the colloidal silicas, i.e. those having particle sizes of less than one micron and frequently in the particle size range of from about .1 to about .5 micron in size. Such colloidal silicas may be either hydrated or non-hydrated.

While we are not certain as to the reason for the beneficial effect of employing the metal oxides in the preparation of electrodes contemplated by this invention, their use in manufacture and the presence of even minor amounts thereof in the finished electrode results in several important advantages. Primary among these is that the electrode and fuel cell employing the same have significantly improved efficiency. In addition such electrodes may be possessed of greater mechanical strength and more readily fabricated, this latter quality resulting from the fact that mixtures containing these oxides more easily handle in forming procedures. As will be evident from the examples hereinafter, this improved efficiency can be demonstrated even where relatively small amounts of catalytic metal is present in the electrode.

In addition, the employment of suitable metal oxides in accordance with this invention seems to enhance the effect of electrodeposited catalytic metals on the electrode, particularly platinum metals.

While beneficial effects are achieved for both oxygen and hydrogen electrodes, the improved effects are not usually achieved to the same degree nor even for the same reasons. Thus, those compositions and procedures which are best for oxygen electrodes may not be best for the hydrogen electrode. However, by operating within the general stated conditions and by producing compositions described herein oxygen and hydrogen electrodes of improved properties result. This is believed to be particularly applicable to oxygen electrodes having a thickness from .1 mil to 50 mils.

One possible explanation, by which we do not wish to be bound, is that the presence of even minor to trace amounts of suitable metal oxides modifies the characteristic of an electrode in favor of hydrophilicity. This may prove beneficial by insuring more advantageous distribution of electrolyte, thus providing for more efficient electrochemical reaction in a fuel cell.

With respect to improving the electro-deposition of metals such as platinum on a formed electrode, the presence of small amounts of oxide may enable the platinum solution to more readily wet even the internal surfaces of (improving the hydrophilicity) a waterproofed electrode, resulting in the more propitious deposition of the platinum.

Another possible explanation is that such oxides may themselves be catalysts for the desired reaction.

With respect to formed catalysts which are subsequently leached to remove substantial amounts of the oxide, a further explanation is possible. Thus, such leaching increases the porosity of the electrode, improving the availability or access to the catalytic sites.

Whatever the reason for the improvements noted above, the essential fact is that when a finely divided metal oxide is incorporaated into a formed porous carbon electrode, the resulting electrode is improved. This improvement is noted even when a substantial portion of the oxide is not leached from the formed catalyst.

As noted, the suitable finely divided metal oxide may be employed in amounts up to about 75% based on the weight of an electrode, though preferably it is employed in amounts of between about 2 and about 50% based on said electrode.

When the electrode is not to be leached, 0.01 to 10% of finely divided metal oxide may be incorporated.

When a formed electrode is leached, a substantial amount of the oxide is removed, and the leached electrode will normally contain less than 5% of the oxide and usually from about .01 to about 2% by weight of residual oxide.

Regarding electrode compositions, the suitable metal oxides may be incorporated into compositions comprising catalytic metal such as platinum and a binding agent, which may also be a waterproofing agent, to prevent flooding or drowning of the electrode. In addition, catalytic metal such as platinum, carbon or catalytic metals such as platinum supported on carbon, binding agent, water-proofing agent and and a suitable metal oxide may be uniformly mixed and formed.

Such composition may contain major amounts of catalytic metal or major amounts of support material therefore or major amounts of a metal oxide and binding-waterproofing agents therefor. While carbon is the most available and generally useful support material, various metals which may be considered chemically inert or various organic polymers which are also chemically inert may be employed for this purpose.

It should be noted that additional amounts of catalytic metals may be imparted to formed electrodes by various means, such as by chemical deposition or electrodeposition. As has been pointed out supra, it is one of the advantages of this invention that catalytic metal is more readily electrodeposited on formed electrodes containing a metal oxide in accordance with this invention.

When an electrode is to have a substantial amount of the metal oxides leached therefrom, the electrodes may be contacted as by being submerged in a suitable leaching agent, as for example a strong alkaline material such as the hydroxides of strong alkali metals, such as sodium, potassium, lithium and ammonium hydroxide. In addition, the carbonates as well as other salts of these metals and of the alkaline earth metals may be emploed. In addition, of course, various acids or complexing agents or materials of equivalent function may be employed to remove metal oxide.

The formed electrode normally will have incorporated therein from about 1 to 50% of binder and waterproofing agent and preferably from about 1 to 50% of a binder-waterproofing agent. Preferably, the amount of binder-waterproofing agent is from between 3 and 30%.

By "binder-waterproofing agent," as the term is employed herein, it is meant a material which assists in the forming of the electrode as by molding, and in addition a material which prevents the flooding of catalytic sites by the presence of fluids such as water, which normally forms in controlled amounts in hydrogen-oxygen or hydrogen-air fuel cells. Suitable binder-waterproofing agents include polytetrafluoroethylene, polyethylene, wax such as petroleum waxes, Carnauba waxes and the like, and chlorotrifluoroethylene.

The electrodes of this invention may contain from 0.001% up to about 99.8% of catalytic metal. Where the electrode is free of carbon or other support material, it will normally contain from about 1 to about 98% of said metal and preferably from about 50 to 95% of said electrode weight.

It must be remembered that the fuel cell may be utilized for different purposes. Where high voltage and low current are desired, catalytic metal may be used in lesser amounts. Where the fuel cell is used as a source of heavy current with low polarization properties, larger amounts of catalytic metal may be included. Electrode composition may thus be varied accordingly.

Where the electrode employs a support material such as carbon, the catalytic metal may have been incorporated into or onto such materials prior to the preparation of the formed electrode, or it may be electrodeposited or chemically deposited thereon, or be incorporated into an electrode by a combination of procedures.

Carbon containing electrodes of this invention may have from about 0.001% up to about 98% of catalytic metal, though preferably the amount is from 0.1% to about 50%. Such percentages refer to platinum metals or metals of the platinum series, and in particular to platinum, palladium and ruthenium. However, it will be appreciated that variations in amounts of metals required will be recorded for different suitable metals in the platinum series as well as for other catalytic metals. In this regard, while reference is directed primarily to platinum as the most commonly available and catalytically useful metal, other members of the platinum metal series, such as palladium, are contemplated for use with this invention and other Group VIII metals such as nickel, cobalt and the like, and Group I(b) elements such as copper, silver, gold and the like may be employed.

The catalytic metals contemplated for use in this invention may be employed singly or in combination with one another.

The formed porous electrode may be of any suitable size and shape useful as an electrode in the preparation of fuel cells, though it is preferably thin, meaning a thickness of less than 20 mils.

In a preferred aspect of this invention, an improved formed porous thin electrode is provided, comprising catalytic metal, a waterproofing-binding agent, and having distributed uniformly therethrough less than about 5% by weight of a finely divided metal oxide such as silica.

If the electrode is to contain carbon, said carbon may be derived from virtually any source such as the distillation of wood, or it may be derived from coal, natural gas or petroleum sources. Suitable carbons include lamp blacks, graphites and other such materials known to be useful as supports for catalytic elements for various applications including fuel cells. Preferably, the carbon should be chemically inert under prevailing electrolyte conditions.

Where the catalyst structure is fragile or it is otherwise desired, the catalyst material may be supported on a suitable support structure. This support structure may be a plastic or glass webbing, or it may be a metallic conductor, not reactive with the electrolyte. Suitable support screens or grids may be nickel (in base solution), tantalum, titanium, Carpenter #20 stainless steel, platinum screen and the like.

Figure 2:
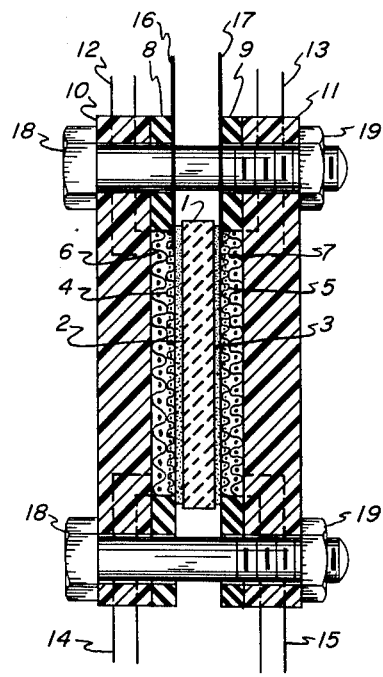

As an aid to understanding the present invention, reference is made herein to the accompanying drawing, in which:

FIG. 1 is an exploded plan view, partially in section, of a fuel cell of the type employed in the present invention; and FIG. 2 is a partially expanded side view, partially in section, of the fuel cell in FIG. 1.

In accordance with the figures, an acidic or basic electrolyte membrane 1 constituted by filter paper saturated with an acidic or basic material such as sulfuric acid or potassium hydroxide or an ion exchange membrane is positioned between porous catalytic electrodes 2 and 3 of the type contemplated by this invention. Positioned to the outside of the porous catalytic electrodes are current collector screens 4 and 5, which may be of stainless steel screen or other suitable inert metal. Stainless steel wire mesh spacers 6 and 7 are used to press the collector screens against the electrodes providing better contact between screen and electrode as well as electrode and membrane and are positioned to the outside of the current collectors. To the outside of the spacers are gaskets 8 and 9 of suitable materials such as silicone rubber gaskets, which function to seal as well as separate the chambers containing reactants. It will be appreciated that in operation, the cell of FIG. 2 is compressed until the gaskets form a seal. To the outside of the gaskets are housing members 10 and 11 having inlet stainless steel tubing 12 and 13 through which hydrogen and oxygen are introduced respectively into the fuel cells. Stainless steel tubing 14 and 15 provides the vents for unused gaseous fuel and oxidizer. Wire leads 16 and 17, connected onto current collector screens 4 and 5 respectively, are the conductive members through which current flows from and to the fuel cell in the external circuit when the cell is in operation. The cell is held together, as for example by bolts 18 and nuts 19.

In order to further illustrate the present invention, the following examples are given primarily by way of illustration. No specific details or enumerations contained therein should be construed as limitations on the present invention except insofar as they appear in the appended claims.

In carrying out the comparative tests reported in Examples 1 through 10 below, the following procedures were employed.

PREPARATION OF MOLDED POROUS CATALYTIC ELECTRODES (a) Carbon containing

The required amount of catalytic powder consisting of platinum deposited on carbon and finely divided metal oxide is combined with a suitable amount of a waterproof-binding agent such as polytetrafluoroethylene and sufficient distilled water to form a slurry. The mixture is spread over a desired area and allowed to dry in a forced air oven. When cracks or pinholes formed, the material was spread out again before molding.

A typical formulation for a 2¾ inch square carbon electrode sheet approximately 7 mils thick employed in the examples following is as follows:

1.3 gms. of carbon or platinized carbon
1.6 ml. of distilled water
0.24 ml. of a polytetrafluoroethylene suspension As will be seen from the accompanying examples, noble metal powder, as for example platinum black or a finely divided metal oxide such as colloidal silica, is substituted as desired in those examples relating to the use of carbon in the electrode. Other waterproofing agents may be substituted for polytetrafluoroethylene.

Aluminum foil having a polished wax surface was used to provide release from the mold or caul plates sprayed with a silicone release agent in order to provide ready release of the molded article.

For testing purposes as described herein, test electrodes 1⅛ inch in diameter are cut from the electrode sheet.

When the electrode is to be leached to remove some but not all of the oxide, it may be placed in a solution of a solubilizing or complexing agent for the oxide. Thus, if the electrode contains silica, a solution of a base such as potassium hydroxide may be used, removing the silica, as potassium silicate. Leaching may be carried out at room or elevated temperatures.

In order to insure maximum contact of electrolyte with the hydrophobic polytetrafluoroethylene electrode, it is often desirable to remove wax and release agents such as silicone grease which may become associated with the electrode during the forming process. In so doing, a dried electrode may be typically soaked for ten or more minutes in a suitable solvent such as trichloroethylene to remove wax present and then soaked in denatured alcohol to remove the trichloroethylene. This step was in turn followed by soaking in an alkaline solution such as a sodium or potassium hydroxide solution to remove silicone mold release compound. It will be apparent that during this stage removal of the metal oxide may be accomplished. Residual alkali may then be removed by soaking in distilled water. When the electrode is to be used with an acid electrolyte, it normally is washed with 0.1 normal sulfuric acid to insure removal of base.

Molding conditions involve the use of temperatures from room temperature up to 350° C. or more and the use of pressures of from 100 to several thousand, as for example five or six thousand p.s.i.

As is noted above, support structures such as platinum screen or other fine mesh wire screen, i.e. stainless steel, nickel or tantalum screen, may be employed as substrates or carriers or supports for catalytic electrode mixtures, such screens being impregnated with the slurries and treated by procedures similar to those described above.

(b) *Electrodes free of carbon*

In preparing electrodes free of carbon, a paste was formed containing the catalytic metal, the finely divided metal oxide, as for example colloidal silica, a suspension of polytetrafluoroethylene and distilled water. The paste was then spread uniformly over a clean stainless steel support carrier and after conventional processing is thereafter ultimately molded, illustratively at room temperature and pressures of up to 5000 p.s.i. The so molded electrode may then be leached, if desired, in a manner described above.

FIG. 1 illustrates the fuel cell employed in the experiments hereinafter. The inlet and outlet stainless steel tubing was heated in the face plates with a trichloroethylene solution of polystyrene. The cell structure was held together with 3/16" stainless steel bolts.

The current collectors were fabricated from platinum screen, 45 mesh with 0.0078" wire. Electrical contact was made to the current collectors with wires woven into the screen. Stainless steel screen spacers were prepared from 10 to 20 mesh screen, 0.025 and 0.015" wire. Both spacers and current collectors were cut to fit the inside diameter of the silicone rubber gasket, 4.9 cm.$^2$, and were inserted into the cell assembly.

In all examples that follow, the same or similar platinum black-polytetrafluoroethylene electrodes are used as standard oxygen electrodes and as standard hydrogen electrodes for comparison purposes. These electrodes contain from 0.19 to 0.25 gram of platinum and are molded for 10 minutes at 325°–350° C. at 500 p.s.i.

The efficiency of each electrode as an anode or a cathode is tested by comparing the output of a fuel cell of the type illustrated in FIGS. 1 and 2 in which the standard electrodes referred to above are used as counter-electrodes. The loss in output of the cell at particular current densities is a measure of the polarization of the electrodes being used. It is desirable, of course, to have the highest possible current densities at particular voltages. All of the current density figures reported hereinafter have been corrected for IR drop, i.e. the voltage loss due to the internal resistance of the cell.

EXAMPLE 1

Two electrode sheets were molded on 84 x 84 mesh stainless steel wire cloth employing polytetrafluoroethylene as a binder-waterproofing agent and the procedures generally outlined above.

The compositions of the electrodes were as follows:

(A)

1.5 gms. of platinum black
0.45 ml. of a polytetrafluoroethylene binder-waterproofing agent
1 ml. of water (B)

1.47 gms. of platinum black
0.03 gm. of a hydrated colloidal silica
0.45 ml. of a polytetrafluoroethylene suspension
1 ml. of water The composition for electrode A was molded for 10 minutes at 315–325° C. and 350 p.s.i. The composition for electrode B was molded for 10 minutes at 325–340° C. and 300 p.s.i.

In both electrodes A and B above, the polytetrafluoroethylene was added to the extent of 18% of the electrode solids composition and in electrode B the colloidal silica constituted 2% of the original or pre-leached electrode solids. After leaching with caustic for one hour the silica content was 0.65% of the electrode solids.

These electrodes A and B were tested as oxygen electrodes in a fuel cell of the type illustrated in FIGS. 1 and 2 against a standard hydrogen electrode described employing 2 normal sulfuric acid as the electrolyte. The polarization data in this comparison demonstrated that for a given voltage the current density is greater for the cell containing the electrode B. Thus at 0.7 volt the current output of the cell containing electrode A is 81 milliamperes/cm.$^2$ while the current output for cells containing electrode B is 90.5 milliamperes/cm.$^2$.

0.7 volt represents a practical operating potential useful for comparative purposes, in view of the fact that the initial voltage employed in these comparisons is usually between 1 and 1.1 volts, and upon drawing current from the cell operating voltage is diminished.

EXAMPLE 2

Two electrode sheets were molded on 84 x 84 mesh stainless steel wire cloth as in Example 1 employing the following compositions:

(C)

1.5 gms. of platinum black
0.25 ml. of polytetrafluoroethylene suspension
1.3 ml. of distilled water (D)

1.44 gms. platinum black
0.06 gm. of colloidal hydrated silica
0.25 ml. of polytetrafluoroethylene suspension
1 ml. distilled water The composition of electrode C was molded for 10 minutes at 325–350° C. and 300 p.s.i. while the composition of electrode D was molded for 10 minutes at 340–350° C. and 300 p.s.i.

In compositions C and D above the polytetrafluoroethylene was added to the extent of 10% of the electrode solids composition, while in electrode D the colloidal silica constituted 4% of the original or pre-leached electrode solids composition. After leaching for one hour with caustic the silica content was 0.38% of the electrode solids.

As in Example 1, electrodes C and D were tested as oxygen electrodes against a standard hydrogen electrode. For a given voltage, current density is greater for the cell containing electrode D. Current density at 0.7 volt cell output was 97.5 milliamperes/cm.$^2$ for electrode C and 120 milliamperes/cm.$^2$ for electrode D.

EXAMPLE 3

Two electrode sheets were molded on 84 x 84 mesh stainless steel wire cloth as in Example 1 employing the following compositions:

(E)

1.5 gms. of platinum black
0.018 ml. of a polytetrafluoroethylene suspension
1.4 ml. distilled water (F)

1.44 gm. of platinum black
0.06 gm. of colloidal hydrated silica
0.18 ml. of a polytetrafluoroethylene suspension
1.8 ml. distilled water The composition of electrode E is molded for 10 minutes at 325–345° C. and 300 p.s.i., while electrode F is molded for 10 minutes at 325–350° C. and 300 p.s.i.

In both electrodes E and F above, the polytetrafluoroethylene was added to the extent of 7.5% of the electrode solids composition and in electrode F the colloidal silica constituted 4% of the original or pre-leached electrode solids. After leaching with caustic for one hour the silica content was 0.54% of the electrode solids.

As in Example 1, electrodes E and F were tested as oxygen electrodes against a standard hydrogen electrode. For a given voltage, current density is greater for the cell containing an electrode formed from composition F. Thus, the current density at 0.8 volt is 40 milliamperes/cm.$^2$ for electrode E and 120 milliamperes/cm.$^2$ for electrode F.

EXAMPLE 4

Two electrode sheets were molded without a support structure employing the following compositions:

(G)

1.3 gms. of graphite containing 5% by weight of chemically deposited platinum
2.5 ml. of distilled water
0.24 ml. of polytetrafluoroethylene (H)

1.25 gms. of graphite containing 5% by weight of chemically deposited platinum
0.05 gm. of colloidal hydrated silica
0.24 ml. of a polytetrafluoroethylene suspension
2.5 ml. of distilled water The composition of electrode G was molded for 10 minutes at 340–350° C. and 300 p.s.i., while the composition of electrode H was molded for 10 minutes at 340–350° C. at 300 p.s.i.

In both electrodes G and H above, the polytetrafluoroethylene was added to the extent of 11% of the electrode solids composition and in electrode H the colloidal silica constituted 4% of the original pre-leached electrode solids. After leaching with caustic for one hour the silica content was 0.46% of the electrode solids.

Electrodes from these sheets were tested as oxygen electrodes against standard hydrogen electrodes as in the preceding examples and the results demonstrated that for a given voltage current density is greater for the cell containing electrode H. Thus, the current density at 0.5 volt was 33 milliamperes/cm.$^2$ for electrode G and 45 milliamperes/cm.$^2$ for electrode H.

EXAMPLE 5

Two electrodes were prepared using polyethylene in lieu of polytetrafluoroethylene as a binder-waterproofing agent. The stainless steel wire cloth (84 x 84 mesh) employed in Examples 1–4 was also used as a support structure for this type of electrode. This cloth, usually 2" x 4", was held flat on a piece of plate glass onto which was spread the paste-like composition described below. After drying the electrode, it was compressed between two plates at 85–90° C. and 100 p.s.i. for 10 minutes, cooled and released. The electrodes were treated with dilute sulfuric acid and washed to remove emulsifying agent.

The electrode compositions employed were as follows:

(I)

0.80 gm. of graphite containing 5% chemically deposited platinum by weight
0.8 ml. of a polyethylene latex
1.6 ml. of distilled water (J)

0.775 gm. of graphite containing 5% chemically deposited platinum by weight
0.025 gm. of colloidal hydrated silica
0.8 ml. of a polyethylene latex suspension In both electrodes I and J above, the polyethylene binder was added to the extent of 10% of the electrode solids composition and in electrode J the colloidal silica constituted 3% of electrode solids.

For a given voltage, current density is greater for the cell containing electrode J when tested as the oxygen electrode as in the previous examples. Thus, current density at 0.6 volt for electrode I is 2.6 milliamperes/cm.$^2$ and for J is 75 milliamperes/cm.$^2$.

The testing of these same electrodes as hydrogen electrodes against the same oxygen electrodes showed that the current density at 0.7 volt was 33 milliamperes/cm.$^2$ for I and 73 milliamperes/cm.$^2$ for J.

EXAMPLE 6

Two electrode sheets were molded on 84 x 84 mesh stainless steel wire cloth as in Example 1 employing the following compositions:

(K)

1.5 gms. of platinum black
0.25 ml. of polytetrafluoroethylene suspension
1.3 ml. of distilled water (L)

1.44 gms. of platinum black
0.06 gm. of silica gel
0.25 ml. of polytetrafluoroethylene suspension
1.3 ml. of distilled water The composition of electrode K was molded for 10 minutes at 325–350° C. and 300 p.s.i. The composition for electrode L was molded for 10 minutes at 325–340° C. and 300 p.s.i.

In both electrodes K and L above, the polytetrafluoroethylene was added to the extent of 10% of the electrode solids composition, and in electrode L the silica gel constituted 4% of the original or pre-leached electrode solids. After leaching with caustic for one hour, the silica content was 0.09% of the electrode solids.

As in the preceding examples, electrodes K and L were tested as oxygen electrodes against a standard hydrogen electrode. For a given voltage, current density is greater for the cell containing electrode L. Current density at 0.7 volt cell output was 97.5 milliamperes/cm.$^2$ for electrode K and 115 milliamperes/cm.$^2$ for electrode L.

EXAMPLE 7

Two electrode sheets were molded on 84 x 84 mesh stainless steel wire cloth as in Example 1 employing the following compositions:

(M)

1.5 gms. of platinum black
0.25 ml. of polytetrafluoroethylene suspension
1.3 ml. of distilled water (N)

1.44 gms. of platinum black
0.06 gm. of alumina ($Al_2O_3$)
0.25 ml. of polytetrafluoroethylene suspension
1.3 ml. of distilled water The composition of electrode M was molded for 10 minutes at 325–350° C. and 300 p.s.i. The composition of electrode N was molded for 10 minutes at 325–340° C. and 300 p.s.i.

In both electrodes M and N above, the polytetrafluoroethylene was added to the extent of 10% of the electrode solids compositions, and in electrode N the alumina constituted 4% of the original or pre-leached electrode solids. After leaching with caustic for one hour, analysis indicated that the alumina content was substantially unchanged.

As in the preceding examples, electrodes M and N were tested as oxygen electrodes against a standard hydrogen electrode. For a given voltage, current density is greater for the cell containing electrode N. Current density at 0.7 volt cell output was 97.5 milliamperes/cm.$^2$ for electrode M and 115.5 milliamperes/cm.$^2$ for electrode N.

EXAMPLE 8

Two electrode sheets were molded on 84 x 84 mesh stainless steel wire cloth as in Example 1 employing the following compositions:

O 1.5 gms. of platinum black
0.25 ml. of polytetrafluoroethylene suspension
1.3 ml. of distilled water

P 1.44 gms. of platinum black
0.06 gm. of titania ($TiO_2$)
0.25 ml. of polytetrafluoroethylene suspension
1.3 ml. of distilled water The composition of electrode O was molded for 10 minutes at 325–350° C. and 300 p.s.i. The composition for electrode P was molded for 10 minutes at 325–340° C. and 300 p.s.i.

In compositions O and P above, the polytetrafluoroethylene addition was equivalent to 10% by weight of the other solid electrode constituents, and in composition P the titania constituted 4% of the solids component before leaching. After leaching for one hour with caustic the titania content was 3.8% of the electrode solids. Electrodes O and P were tested as hydrogen electrodes against a standard oxygen electrode. For a given voltage, current density is greater for the cell containing electrode P. Current density at 0.6 volt cell output was 78.5 milliamperes/$cm.^2$ for the electrode O and 90.0 milliamperes/$cm.^2$ for electrode P.

EXAMPLE 9

An electrode sheet was prepared without support structure employing the following composition:

0.58 gm. 5% platinum chemically deposited on a graphitic carbon
0.025 gm. colloidal hydrated silica
1.5 ml. of distilled water
0.11 ml. of polyetetrafluoroethylene suspension In the composition above, the polytetrafluoroethylene was added to the extent of 11% of the electrode solids composition and the colloidal silica constituted 4% of the original or pre-leached electrode solids composition. After leaching, the silica content was about 0.5% of the electrode solids. The molding conditions of this electrode sheet were 10 minutes at 325–350° C. and 300 p.s.i.

An electrode from the above sheet was tested as a hydrogen and oxygen electrode against standard counter electrodes. It was then platinized for 30 seconds at 400 milliamperes (depositing 6 milligrams of platinum black over 5.9 $cm.^2$ area) and retested as above. A comparison of performance before and after platinization is shown in Table I below.

*Table I*

|  | Ma./$cm.^2$ at 0.7 V. ||
|---|---|---|
|  | As an $H_2$ electrode | As an $O_2$ electrode |
| Unplatinized electrode | 69.3 | 16.5 |
| Platinized electrode | 90.5 | 57.0 |

EXAMPLE 10

Platinum black (0.225 g.), colloidal silica (.025 g.), polytetrafluoroethylene suspension (.083 ml.) and deionized water (.25 ml.) was made into a paste and spread on a 4 square inch area of 200×200 mesh stainless steel screen pressed at 5000 p.s.i., dried at 105° C., and repressed at 5000 p.s.i. and room temperature. The electrode sheet was cut into one-inch circles, which were washed with trichloroethylene and ethanol, and soaked for 1½ hours at 30% KOH at 70° C. to remove a substantial portion of silica. These electrodes, approximately 3.5 mils thick, and containing about 7 mg. Pt/$cm.^2$, when used as hydrogen and oxygen electrodes in a fuel cell of the type shown in FIGS. 1 and 2 with $2NH_2SO_4$ as the electrolyte, gave the following performance which is uncorrected for IR:

| Current Density, ma./$m.^2$ | 0 | 50 | 100 | 200 | 300 |
|---|---|---|---|---|---|
| Working Voltage | 1.03 | .82 | .76 | .64 | .49 |

Example 10 above illustrates that improved electrodes contemplated by this invention may be formed employing low temperature high pressure-forming techniques. It will be noted from Example 10 that the electrode composition contained substantial amounts of binder-waterproofing agent which facilitates low temperature high pressure molding.

While the present invention has been described primarily in connection with oxygen electrodes of the type employed in hydrogen-oxygen or hydrogen-air fuel cells, it will be understood that this electrode may be employed in fuel cells employing various fuels. It should be noted that Example 5 demonstrates that the teachings of this invention are in general applicable to hydrogen electrodes for use in similar devices.

We claim:

1. A molded electrode comprising carbon, a catalytic metal and having distributed therethrough a finely divided oxide of a metal selected from the group consisting of Groups III, IV and V of the Periodic Table in an amount up to 5% by weight of said electrode, said metal oxide being the residue of said oxide in the electrode, after leaching from the electrode of a portion of said oxide, said catalytic metal being present in catalytically effective amounts.

2. An electrode according to claim 1 in which the finely divided metal oxide is colloidal silica.

3. An electrode according to claim 1 in which the catalytic metal is a platinum metal.

4. A fuel cell electrode comprising a corrosion resistant grid impregnated with carbon, said carbon having uniformly dispersed therein a finely divided oxide of a metal selected from the group consisting of Groups III, IV and V of the Periodic Table in an amount up to 5% by weight of the electrode, said metal oxide being the residue of said oxide in the electrode after leaching from the electrode of a portion of said oxide, and a catalytically effective amount of a catalytic metal.

5. An electrode according to claim 4 in which the finely divided metal oxide is colloidal silica.

6. An electrode according to claim 4 in which the catalytic metal is platinum.

7. A process for preparing a formed fuel cell electrode which comprises forming an electrode composition comprising from about 1% to about 75% of a finely divided oxide of a metal selected from the group consisting of Groups III, IV and V of the Periodic Table, a binder-waterproofing agent and a catalytically effective amount of a catalytic metal, and thereafter removing a portion of said metal oxide from said molded electrode so that the final formed electrode contains from about 0.01 to about 5% based on the weight of said electrode of said metal oxide.

8. A process according to claim 7 in which the metal oxide is colloidal silica and the catalytic metal is platinum.

9. A process for preparing a molded fuel cell electrode which comprises molding an electrode composition comprising from about 1% to about 50% of a finely divided oxide of a metal selected from the group consisting of Groups III, IV and V of the Periodic Table, a binder-waterproofing agent and a catalytic metal, leaching a portion of said metal oxide from said molded electrode so that the electrode contains from about 0.01 to about 5% based on the weight of said electrode of said metal oxide.

10. A process for preparing a formed fuel cell electrode which comprises forming an electrode composition comprising from about 1% to about 50% of a finely divided oxide of a metal selected from the group consisting of Groups III, IV and V of the Periodic Table, a binder and a catalytic metal, leaching a portion of said metal oxide from said molded electrode so that the electrode contains from about 0.01 to about 5% based on the weight of said electrode of said metal oxide, and thereafter electrodepositing additional catalytic metal on said electrode.

11. A process according to claim 10 in which the additional electrodeposited catalytic metal is platinum.

12. A process for preparing a molded fuel cell electrode which comprises molding an electrode composition comprising from about 1% to about 50% of a finely divided oxide of a metal selected from the group consisting of Groups III, IV and V of the Periodic Table, a binder-waterproofing agent, carbon, and a catalytic metal, leaching a portion of said metal oxide from said molded electrode so that the electrode contains from about 0.01 to about 5%, based on the weight of said electrode of said metal oxide.

13. A fuel cell comprising an electrolyte, formed electrodes, at least one of which comprises a finely divided oxide of a metal selected from the group consisting of Groups III, IV and V of the Periodic Table in an amount up to 5% by weight of the electrode and a catalytic metal, said metal oxide in amounts up to 5% being the residue of said oxide in the electrode after the leaching from the electrode of a portion of said oxide.

14. A hydrogen-oxygen fuel cell comprising an electrolyte, molded electrodes, at least one of which comprises carbon, a catalytic metal and having distributed therethrough a finely divided oxide of a metal selected from the group consisting of Group III, IV and V of the Periodic Table in an amount up to 5% by weight of said electrode, said metal oxide in amounts up to 5% being the residue of said oxide in the electrode after the leaching from the electrode of a portion of said oxide.

15. A fuel cell according to claim 14 in which the molded electrode is the oxygen electrode.

16. A fuel cell according to claim 14 in which the molded electrode is a hydrogen electrode.

17. A fuel cell electrode comprising a finely divided silica, polytetrafluoroethylene as a binder-waterproofing agent and a catalytically effective amount of a platinum metal.

18. A fuel cell electrode comprising a finely divided silica, polytetrafluoroethylene as a binder-waterproofing agent and from .001 to about 98% by weight of the electrode of platinum.

19. A fuel cell electrode comprising a metallic screen impregnated with a composition comprising carbon, said carbon having uniformly dispersed therein a colloidal silica in an amount up to 5% by weight of the electrode, a catalytically effective amount of a platinum metal, and, as a binder-waterproofing agent, polytetrafluoroethylene.

20. An electrode comprising a finely divided oxide of a metal selected from the group consisting of Groups III, IV and V of the Periodic Table, a binder and a catalytically effective amount of a catalytic metal said finely divided metal oxide being present in an amount up to 5% by weight of the electrode and being the residue of said oxide in the electrode, after leaching from the electrode a portion of said oxide.

21. An electrode comprising a finely divided silica, a binder and a catalytically effective amount of a catalytic metal, said finely divided silica being present in an amount of up to 5% by weight of the electrode and being the residue of said silica in the electrode, after leaching from the electrode a portion of said silica.

22. An electrode comprising a finely divided alumina, a binder and a catalytically effective amount of a catalytic metal, said finely divided alumina being present in an amount of up to 5% by weight of the electrode and being the residue of said alumina in the electrode, after leaching from the electrode a portion of said alumina.

23. An electrode comprising a finely divided oxide of a metal selected from the group consisting of Groups III, IV and V of the Periodic Table, a binder-waterproofing agent and a catalytic material comprising a catalytic material and carbon said catalytic material being present in a catalytically effective amount and said finely divided metal oxide being present in an amount of up to 5% by weight of the electrode and being the residue of said oxide in the electrode, after leaching from the electrode a portion of said oxide.

24. A fuel cell electrode comprising from about .01 to about 10% of a finely divided oxide of a metal selected from the group consisting of Groups III, IV and V of the Periodic Table, a binder and a catalytically effective amount of a catalytic metal said finely divided metal oxide being the residue of said oxide in the electrode after leaching from the electrode a portion of said oxide.

References Cited by the Examiner

UNITED STATES PATENTS

| | | | |
|---|---|---|---|
| 1,687,307 | 10/1928 | Oppenheim | 136—120 |
| 1,867,435 | 7/1932 | Adair | 136—120 |
| 1,868,565 | 7/1932 | Connolly | 136—120 |
| 2,928,891 | 3/1960 | Justi et al. | 136—120 |
| 3,013,098 | 12/1961 | Hunger et al. | 136—86 |
| 3,055,840 | 9/1962 | Koch | 252—460 |
| 3,097,974 | 7/1963 | McEvoy et al. | 136—86 |
| 3,098,030 | 7/1963 | Coonradt et al. | 252—460 |
| 3,121,029 | 2/1964 | Duddy | 136—120 |

FOREIGN PATENTS

| | | |
|---|---|---|
| 233,847 | 5/1961 | Australia. |

WINSTON A. DOUGLAS, *Primary Examiner.*

JOHN H. MACK, *Examiner.*